(12) United States Patent
Dubose

(10) Patent No.: US 12,514,175 B2
(45) Date of Patent: Jan. 6, 2026

(54) METHOD AND SYSTEM FOR ENHANCING PLANT GROWTH

(71) Applicant: Robert Dubose, New Port Richey, FL (US)

(72) Inventor: Robert Dubose, New Port Richey, FL (US)

(73) Assignee: Hyo Technologies, Inc., Raleigh, NC (US)

( * ) Notice: Subject to any disclaimer, the term of this patent is extended or adjusted under 35 U.S.C. 154(b) by 0 days.

(21) Appl. No.: 18/295,697

(22) Filed: Apr. 4, 2023

(65) Prior Publication Data

US 2023/0284574 A1    Sep. 14, 2023

Related U.S. Application Data

(63) Continuation of application No. 16/922,960, filed on Jul. 7, 2020, now Pat. No. 11,647,706.

(60) Provisional application No. 62/906,994, filed on Sep. 27, 2019.

(51) Int. Cl.
*A01G 25/06* (2006.01)
*C02F 1/461* (2023.01)
*C25B 1/04* (2021.01)

(52) U.S. Cl.
CPC .......... *A01G 25/06* (2013.01); *C02F 1/46104* (2013.01); *C25B 1/04* (2013.01)

(58) Field of Classification Search
None
See application file for complete search history.

(56) References Cited

U.S. PATENT DOCUMENTS

2017/0202156 A1* 7/2017 Harms .................... A01G 7/04

* cited by examiner

*Primary Examiner* — Wojciech Haske
(74) *Attorney, Agent, or Firm* — Michael L. Greenberg, Esq.; Greenberg & Lieberman, LLC

(57) ABSTRACT

A method and system for use therein for providing $O_2$ and $H_2$ gases directly to the soil proximal to the roots of plants via electrolysis is described. The method employs at least one electrolyzer disposed adjacent to, or inline with, the irrigation waterline of the plant grow operation to facilitate the introduction of the gases to the soil. A power source is used to provide the electrolytic conversion, and gases remain in a micro-bubbled form to flow through the waterline more easily to the plants where they are needed the most. A venturi is used to channel the dissolved gases in the waterline from the electrolyzer in embodiments having an external HyGrO unit. The inline embodiment electrolyzes the water without need of a venturi to reintroduce the gases to the waterline.

7 Claims, 3 Drawing Sheets

METHOD AND SYSTEM FOR ENHANCING PLANT GROWTH

CONTINUITY

This application is a continuation of non-provisional patent application Ser. No. 16/992,960, filed on Jul. 7, 2020, and of provisional application No. 62/906,994, filed on Aug. 25, 2019, and priority is claimed thereto.

FIELD OF THE PRESENT INVENTION

The present invention relates to methods for enhancing stamina, health, growth and yield in plants. In particular, the present invention relates to methods for enhancing growth and yield by exposing soil to hydrogen and/or oxygen gases ($H_2+O_2$), via the waterline as produced via electrolysis, where $H_2$ and/or $O_2$ is bubbled or dissolved into the water line while being delivered to the plant root rhizosphere in the soil. Broadly, the present invention is a method for enhancing plant growth or yield by exposing soil to $H_2$ gas and/or $O_2$ gas, and growing plants in the soil.

BACKGROUND OF THE PRESENT INVENTION

Farmers and scientists have long understood that oxygenated soils improve plant respiration, mineral uptake, and water movement in roots, all of which have a positive impact on plant growth and productivity. More recently, researchers discovered that hydrogen also plays a significant role in plant health and stamina. The successful delivery of nitrogen to plant roots is highly dependent upon soil conditions, environmental conditions, and the type of fertilizer. Healthy soil bacteria are essential for the conversion of traditional fertilizers into useable nitrogen for plants. Farmers utilize legumes, which produce hydrogen as a byproduct of $N_2$ fixation, to regenerate soil after a season or two of growing high demand crops. Scientific studies suggest hydrogen could be the missing ingredient required to ensure a healthy and thriving soil ecosystem.

Hydrogen and oxygen can best assist in the growth of plants when it is exposed to the roots of the plant. If there were a way in which oxygen and hydrogen could be introduced to the plants in a focused and controlled manner, on demand, to the locations needing it most, namely, the roots, the growth of the plants would be enhanced.

Conventionally, tilling of the soil is preferably performed in order to introduce oxygen into the soil. However, tilling is known to cause issues to proximal land and nearby water systems due to runoff. Some jurisdictions limit the frequency of tilling, and others have regulations in place which fine individuals found to be tilling more frequently than the allotment stated in the regulations. If there were a way in which tilling could be further reduced or eliminated, fewer fines would be imposed, and the health of the land and proximal bodies of water could be preserved.

Thus, there is a need for a new plant growth enhancing method and system configured to expedite and facilitate the growth of plants via the careful and deliberate introduction of specific gases to the soil, substrate, and/or irrigation system of the grow operation. Such a method may be configured to employ a venturi system to introduce the desired gases into the irrigation system of the grow operation. Alternately, electrolysis equipment is preferably disposed directly inside of the water line to facilitate introduction of the desired gases to the grow operation to enable the method of the preferred embodiment of the present invention.

SUMMARY OF THE PRESENT INVENTION

The present invention is a plant growth enhancement system and apparatus configured to facilitate and expedite the growth of plants grown in a controlled environment. The system employs integrated electrolysis equipment disposed within the water line itself of the irrigation system of the grow operation to enable to seamless introduction of the desired gases, namely hydrogen and oxygen, to the plants to stimulate growth.

It is an object of the present invention to provide a method for enhancing plant stamina, health growth and yield by exposing soil to hydrogen and or oxygen gases ($H_2$ and/or $H_2+O_2$). It is envisioned that by increasing the amount of gases delivered to the soil before seeding, flowering/budding, the growth rate could be accelerated, along with an overall better health and stamina of the plants being observed.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

Figure 1:
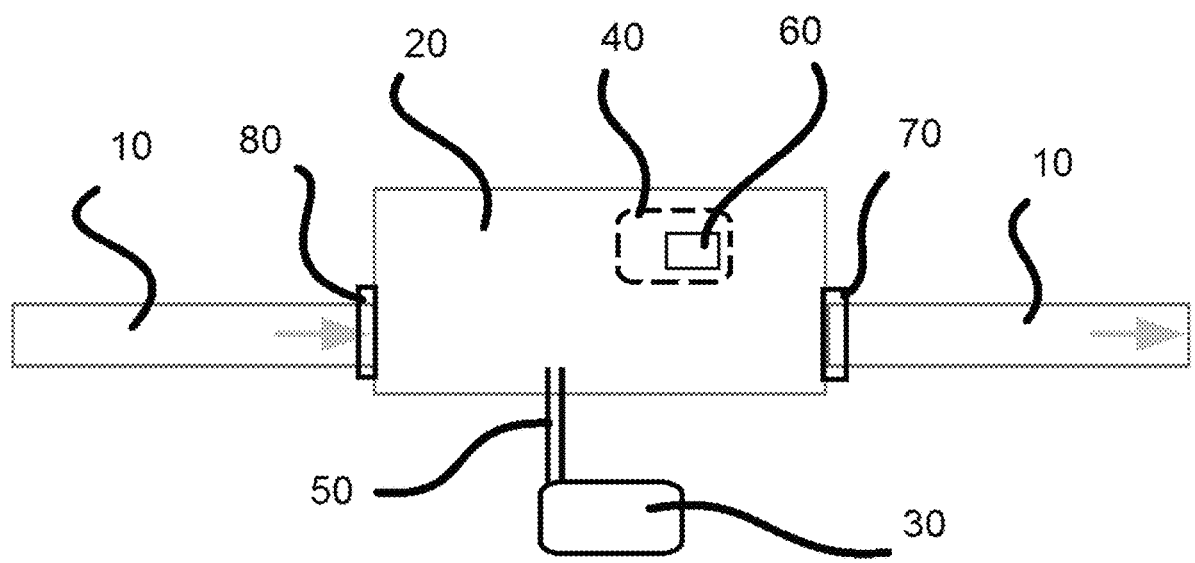
FIG. 1 depicts a view of the primary embodiment of the method system of the present invention shown as a flow chart diagram.
Figure 2:
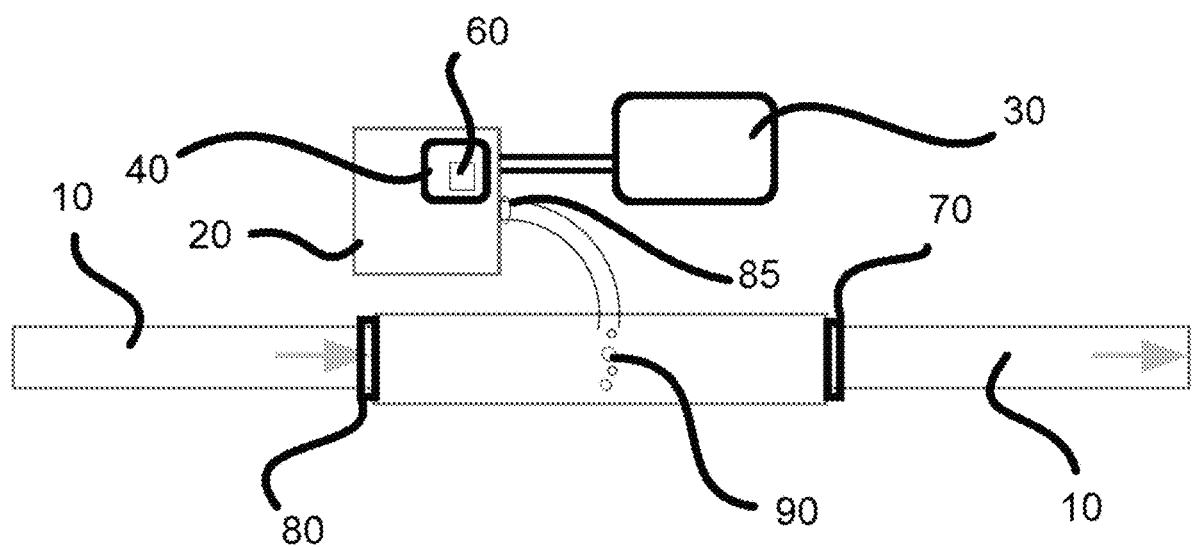
FIG. 2 depicts a view of the second embodiment of the method and system of the present invention, employing a venturi entry system, shown as a flow chart diagram.

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a method of enhancing the growth of plants within a controlled growth environment. The method employs an irrigation water line (10) of an existing irrigation system of the grow operation to facilitate the introduction of hydrogen and/or oxygen to the plants of the grow operation which are produced via electrolysis. As such, the present invention is configured to introduce these plant growth-enhancing gases where they are needed most, at the roots of the plant, to stimulate growth.

The system preferably includes two methods of achieving the desired outcome of enhanced plant growth: a first method detailing the use of an in-line unit (20), and a second method configured to employ a venturi to facilitate the introduction of the desired gases to the water line (10) of the irrigation system of the grow operation from a nearby external unit (20). In each method, a power source (30) is employed to power a hydrogen and/or oxygen processor (40) disposed within the unit (20). Power is conveyed from the power source (30) to the hydrogen and/or oxygen generator via at least one wire (50).

The primary difference between the two methods is the means by which the gases are introduced to the water line (10). The mechanics of the unit (20) itself remains consistent in both methods, however the means of introduction of the gases varies. In both cases, an electrolyzer (60) disposed within the unit (20) employs electricity from the power source (30) to split water, coming from the water line (10) of the irrigation system of the grow operation, into hydrogen and oxygen in gaseous form respectively.

Hydrogen and oxygen produced via the electrolyzer (60) are present in the form of micro-bubbles (90) which are then dissolved and reintroduced to the water line (10) as it exits an output (70) of the unit (20). Dissolution of the micro-bubbles (90) ensures that the gases effectively disappear into the water column, reducing possible percentage loss as the gases exit the waterline and allowing more of the beneficial gases to get to the roots of the plants. Alternately, in the second method, the micro-bubbles of hydrogen and oxygen are effectively dissolved and introduced back to the water line (10) via a venturi facilitated via a coupling (85) disposed on a side of the unit (20) as shown in FIG. 1.

It should be understood that the technology is scalable to size, depending on the waterline diameter and gallons-per-minute (GPM) of waterflow. The electrolyte in the elecro-lyzer of the unit (20) of the present invention may vary; however, it is envisioned that the second method which uses the venturi-based system employs NAOH or KOH electrolytes. Conversely, the first method which uses the inline system is preferably configured to use only electrolytes derived from the minerals present in the irrigation water itself.

Insulation is not ideally needed because the system used in the method of the present invention is preferably shut down and drained during winter months. The venturi method requires routine maintenance and is easily accessible. The inline method of use of the unit (20) in the method of the present invention preferably requires no maintenance. The venturi system employed in the method of the present invention has its own, self-contained, cooling methodology. In contrast, the inline system stays cool during operation because the water is constantly flowing through it, cooling the electrolyzer (60) within the unit (20) continuously. It should be noted that the unit (20) is equipped with an input (80) and an output (70) per convention.

It should be understood that the method of execution, as well as the hardware employed in the method, is consistent for hydroponic grow operations as well conventional soil substrate grow operations.

As previously indicated, the methods of the present invention enable the introduction of $H_2$, $O_2$, or both gases to the water via the irrigation waterline. The venturi method allows for the separation of the gases, where either could be vented off within the unit (20) prior to introduction of the gas to the waterline via the venturi. In contrast, the inline method using the inline unit (20) delivers only both gases simultaneously, and therefore does not enable one to select what gas or how much is provided to the waterline.

Figure 3:
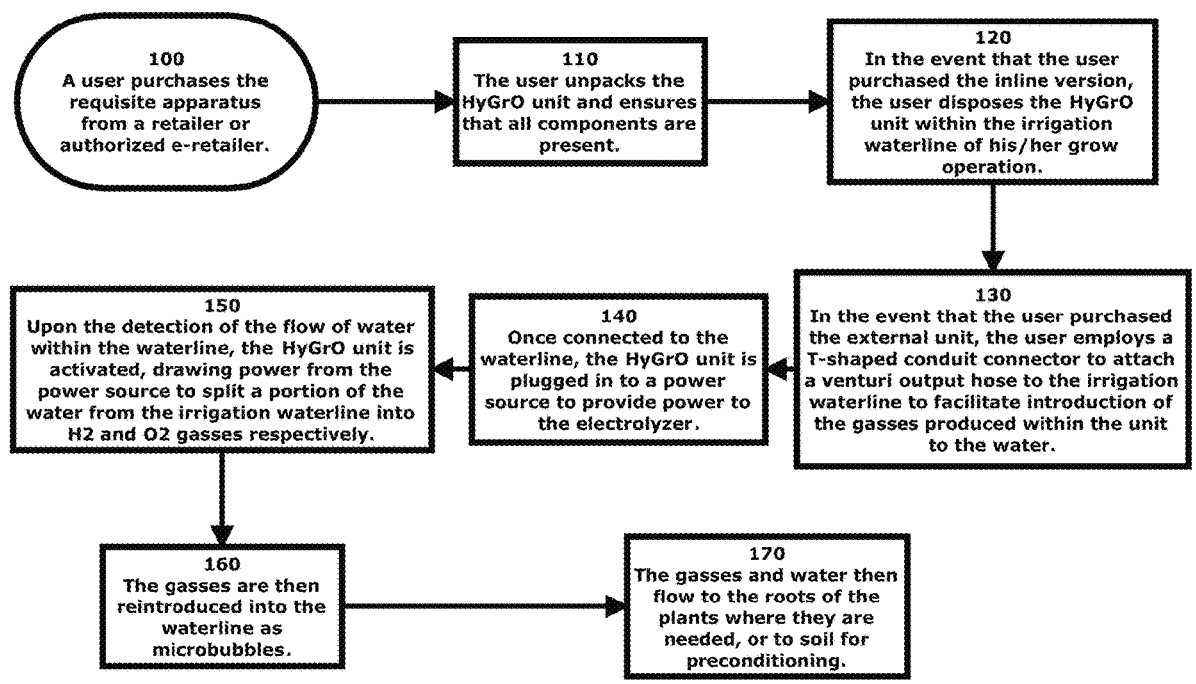
FIG. 3 shows a flow chart detailing the method and system of the present invention in operation.

The process of installation and use of the system and apparatus of the present invention, as shown in FIG. 3, is preferably as follows:

1. A user purchases the requisite apparatus from a retailer or authorized e-retailer. (100) The apparatus required for the method of the present invention is an electrolyzer present within an external unit OR an inline unit.
2. The user unpacks the unit and ensures that all components are present. (110)
3. In the event that the user purchased the inline version, the user disposes the unit within the irrigation waterline of his/her grow operation. (120) This may be accomplished by cutting the irrigation line and installing the inline unit through attaching the now two separated lines to the input and output ends of the inline unit and ensuring the lines are firmly affixed to the input and output sides of the unit.
4. In the event that the user purchased the external unit, the user employs a T-shaped conduit connector to attach a venturi output hose to the irrigation waterline to facilitate introduction of the gases produced within the unit to the water. (130)
5. Once connected to the waterline, the unit is plugged in to a power source to provide power to the electrolyzer. (140)
6. Upon the detection of the flow of water within the waterline, the unit is activated, drawing power from the power source to split a portion of the water from the irrigation waterline into $H_2$ and $O_2$ gases respectively. (150)
7. The gases are then reintroduced into the waterline as dissolved microbubbles. (160)
8. The gases and water then flow to the roots of the plants where they are needed, or to soil for preconditioning. (170)

It should be noted that the process of adding more $H_2$ or $H_2$ and $O_2$ to the soil is preferably in excess of 50 times more than what is presently found in the atmosphere on average. Additionally, it may be advantageous to add $H_2$ or $H_2$ and $O_2$ to the soil during the off-season months in order to 'bank' the gases into the soil for the subsequent season's grow operation in order to help to increase the growth and yield. By either increasing the electrical input from the power source (30) or by reducing the gallons per minute of the waterflow of the waterline, more $H_2$ or $H_2$ and $O_2$ could be deliver to the target crop as a percentage of overall irrigation.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A method of delivering hydrogen to plants to enhance their growth comprising:
 disposing a unit in communication with an irrigation water supply;
 wherein the unit contains an electrolyzer, a waterline input, and a waterline output;
 connecting the electrolyzer of the unit to a power supply;
 initiating the flow of irrigation water within a waterline, the passage of irrigation water activating the electrolyzer of the unit;
 the irrigation water supply providing the flow of water to the waterline;
 the electrolyzer converting irrigation water of the waterline into oxygen and hydrogen, wherein the electrolyzer splits water, coming from the waterline of the irrigation water supply;
 wherein the entirety of the waterline flows through the electrolyzer;
 the unit channeling dissolved microbubbles of hydrogen and oxygen into the waterline;
 water saturated with the dissolved microbubbles exiting the unit via the waterline output;
 the water saturated with the dissolved microbubbles being delivered to the soil of the plants prior to seeding;
 the unit shut down during winter months; and
 the unit and the irrigation water supply drained during winter months.

2. The method of claim 1, further comprising:
 exposing the soil of the plants to the microbubbles, banking oxygen into the soil.

3. The method of claim 2, further comprising:
 exposing the soil of the plants to the microbubbles, banking hydrogen into the soil.

4. The method of claim 2, further comprising: the plants absorbing the water, exposing them to the microbubbles, enhancing plant growth.

5. The method of claim 1, further comprising:
 exposing the soil of the plants to the microbubbles, banking hydrogen into the soil.

6. The method of claim 1, further comprising: the plants absorbing the water, exposing them to the microbubbles, enhancing plant growth.

7. The method of claim 1, further comprising:
 exposing the soil of the plants to the microbubbles, banking hydrogen and oxygen into the soil.

* * * * *